March 7, 1967

C. L. ISBORN ETAL 3,308,455

READOUT DEVICE

Filed Jan. 15, 1965

INVENTORS
CARL L. ISBORN
BY ELBERT L. WARREN

*Samuel B. Stone*

ATTORNEY

March 7, 1967 C. L. ISBORN ET AL 3,308,455
READOUT DEVICE
Filed Jan. 15, 1965 2 Sheets-Sheet 2
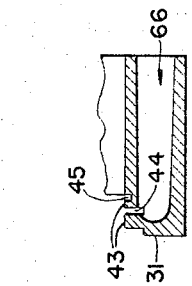
FIG. 4d
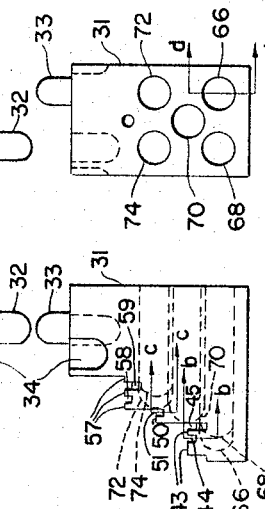
FIG. 3
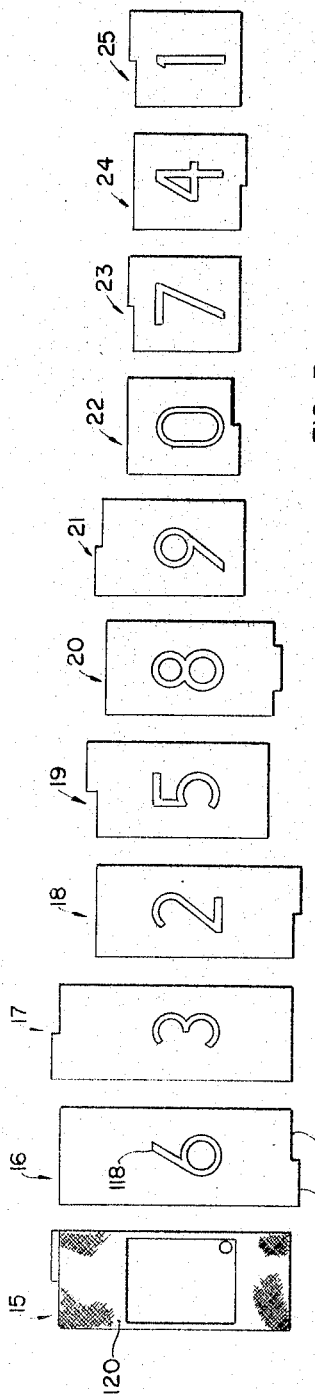
FIG. 5
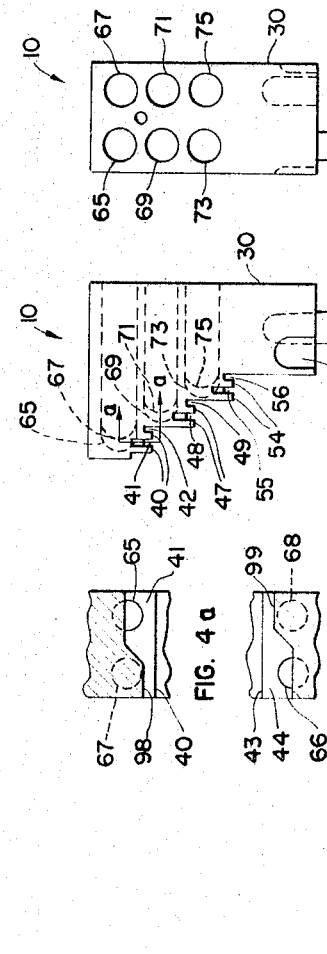
FIG. 2
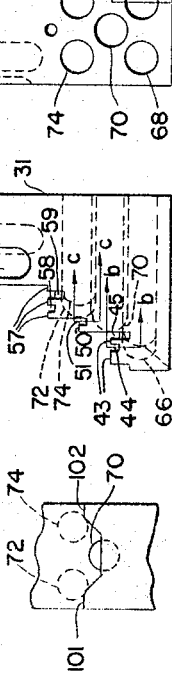
FIG. 4a
FIG. 4b
FIG. 4c
INVENTORS
CARL L. ISBORN
BY ELBERT L. WARREN
*Samuel B. Stone*
ATTORNEY 3,308,455
READOUT DEVICE
Carl L. Isborn, San Pablo, and Elbert L. Warren, Richmond, Calif., assignors to Beckman Instruments, Inc., a corporation of California
Filed Jan. 15, 1965, Ser. No. 425,805
11 Claims. (Cl. 340—380)

This invention relates to visual indicators or readout devices and more particularly to a new and improved multi-symbol visual indicator.

It is desirable to have means for visually indicating various indicia, such as, Arabic symbols and decimal digits 0 through 9 and at the same time have each indicia appear to emanate from the same area. There are various types of visual indicators presently utilized, among which are the electroilluminescent type, gaseous tube type and stacked plate type. Stacked plate indicators, to which the present invention pertains, typically include a plurality of superimposed thin plates of plastic material which are capable of internally reflecting light which has entered the material. Each plate has inscribed thereon lines forming a symbol, numeral, etc., to be displayed, and a lamp is associated with each plate in a manner to efficiently transmit light into the plate. Light within the plate is scattered by the inscribed surface which then appears as an illuminated symbol.

Indicators of this nature frequently are employed in electrical instruments, with one or more such devices being mounted on the front panel thereof. Examples of such instruments are counters and digital voltmeters which include such indicators to readily provide rapid visual readout, in digital form, of the electrical output of the instrument. It is, of course, desirable for the visual indicator to be easy to read from normal viewing angles, relatively compact so as not to require excessive space on the front panel of the instrument, and reasonably economical to manufacture. Prior art stacked plate indicator devices have been characterized by one or more drawbacks. The typical prior art indicator device is relatively large and bulky, and requires a considerable amount of front panel space and space within the instrument. Attempts have been made to reduce the size of such indicator devices by employing light piping techniques within the indicator device. Certain prior art devices employing such light piping techniques frequently are larger than is desirable, and additionally require considerable care in the bending of the plates and in the assembly of the indicator device.

It is accordingly an object of the present invention to provide an improved visual indicator device which is relatively compact and simple to manufacture and construct.

An additional object of the present invention is the provision of a novel stacked plate indicator which is compact and in which no bending of the plates is required.

A further object of the present invention is the provision of an improved stacked plate indicator having a minimum stack depth and having substantially improved optical efficiency.

In accordance with an exemplary embodiment of the teachings of the present invention, an improved stacked plate indicator is provided which includes a plurality of plates, an indicator block and lamps. The plates are stacked and positioned on the block with tabs on the plates extending into slots within the block. Cavities are provided in the block for receiving the lamps, and each of these cavities communicates with a respective slot whereby each lamp illuminates a respective plate. The plates have indicia inscribed thereon, the indicia preferably being formed on each plate by lightly inscribing double lines forming the particular indicia. When an individual lamp is energized, reflection by the inscribed indicia on the respective plate associated with that lamp causes the indicia to become illuminated. Each lamp cavity communicates with a single plate and optical isolation or separation between plates is accomplished by virtue of the elevation and penetration into the lamp block of each cavity. This arrangement allows both a compact structure to be provided and one which is relatively simple to construct.

Other features and objects of the invention will be better understood from a consideration of the following detailed description when read in conjunction with the attached drawings in which:

FIG. 2 is a side view of the indicator block shown in FIG. 1 with the plates removed therefrom;

FIG. 3 is a rear, or back, view of the indicator block shown in FIG. 2;

FIGS. 4a, 4b, 4c and 4d are sectional views taken along the respective lines a—a, b—b, c—c and d—d in FIG. 2; and FIG. 5 illustrates exemplary indicator plates.

Figure 1:
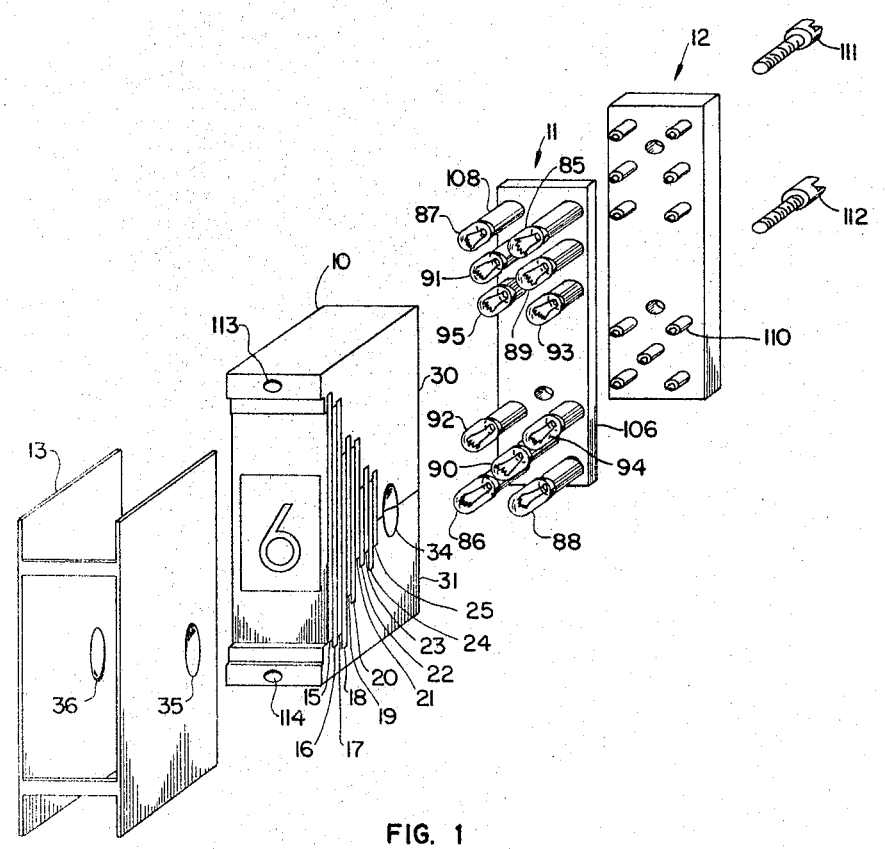
FIG. 1 is an exploded view of an indicator constructed in accordance with the teachings of the present invention.

Referring now to the drawings, FIG. 1 illustrates an exploded view of an indicator device constructed in accordance with the teachings of the present invention and includes an indicator block 10 with a plurality of plates positioned therein, a lamp assembly 11, a pressure contactor 12 and a cover and retainer 13. Typical dimensions for the indicator block are approximately three-quarters of an inch wide, two and three-eighths inches high and one inch deep. Eleven plates 15 through 25 which may be fashioned from a suitable plastic, such as Lucite, are shown positioned on the block 10 in FIG. 1. These plates are illustrated in greater detail in FIG. 5.

In order to fully understand the construction of the indicator block 10, reference should be made to FIGS. 1 through 4, and particularly FIG. 2. According to a feature of the invention, a plurality of slots are provided in the indicator block 10 for receiving the ends of the plates 15 through 25, and a plurality of lamp cavities are provided in the block communicating with respective slots. The indicator block 10 preferably is constructed in two parts 30 and 31. Protrusions or pins 32 and 33 are provided in the respective parts 30 and 31 and communicate with mating holes in the respective parts 31 and 30 for aligning and retaining the two parts as a single unitary structure. A recess 34 is provided in each side of the indicator block 10 for retaining the cover 13 by means of depressions 35 and 36 formed therein.

The forward portion of the indicator block 10 is formed to serve as a support for the plates 15 through 25. The support portion of the block 10 is a stair step arrangement of a plurality of lands each having one or more slots or grooves therein for receiving the ends of the plates. This particular arrangement is best illustrated in FIG. 2, with sectional views of the slots being shown in FIGS. 4a through 4c. A first upper land 40 has slots 41 and 42 therein, and a first lower land 43 has slots 44 and 45 therein. The tab end of the first plate 15 is positioned in the slot 41 with the opposite end thereof abutting the forward portion of the lower land 43. In a similar manner, the tab end of the second plate 16 is positioned in the slot 44 with the opposite end thereof abutting the rear portion of the upper land 40. Likewise, the end of the third plate 17 is positioned in the slot 42 with the opposite end thereof abutting the rear portion of the land 43. To the rear of lands 40 and 43 are lands 47 and 50 having respective slots 48 and 49, and 51. The end of the fourth plate 18 is situated in the slot 45 with the opposite end thereof abutting the forward portion of the land 47. In a similar manner, the ends of plates 19, 20 and 21 are positioned in slots 48, 51 and 49 respectively. Rearmost lands 54 and 57 include respective slots 55 and 56, and 58 and 59. The ends of respective plates 22 through 25 are located in the respective slots 58, 55, 59 and 56.

Eleven cavities 65 through 75 (FIG. 3) are provided for receiving respective lamps 85 through 95 (FIG. 1). These cavities may be holes which are drilled to different depths in order that each individual hole or cavity may bisect a portion of one of the slots into which the ends of the plates are located.

The details of the slots in the indicator block are shown in FIGS. 4a through 4c. FIG. 4a is a view taken along the line a—a in FIG. 2 and illustrates in greater detail the configuration of the slot 41. It should be noted that the slot 41 is cut in such a manner so as to expose the end of the lamp cavity 65, and to provide a shoulder 98. The shoulder 98 is located in front of the lamp cavity 67 and ensures isolation between the lamp cavity 67 and the slot 41 (and consequently the end of the plate located in the slot 41). Slots 48 and 55 are the same as the slot 41. The remaining slots 42, 49 and 56 in the top portion 30 of the lamp block 10 in FIG. 2 are constructed in the same manner as shown in FIG. 4a except the shoulder therein is on the opposite side.

The slot 44 in the lower portion 31 of the indicator block 10 in FIG. 2 is shown in greater detail in FIG. 4b. FIG. 4b is a sectional view taken along the line b—b in FIG. 2. The slot 44 is cut so as to expose the end of the lamp cavity 66 and to provide a shoulder 99 in a similar manner to the arrangement shown in FIG. 4a. Slot 58 is the same as the slot 44, and slots 45 and 59 are similar, but the shoulder is reversed. The configuration of the slot 51 is shown in detail in FIG. 4c which is a sectional view taken along the line c—c in FIG. 2. It will be noted that this slot 51 is cut so as to expose the end of the lamp cavity 70 and to provide shoulders 101 and 102.

FIG. 4d, which is a sectional view taken along the line d—d in FIG. 3, shows the manner in which a lamp cavity 66 intersects a slot 44. The cavity 66 extends past the slot 45 which is immediately behind the slot 44. This can occur while still maintaining optical isolation between cavities because of the shoulder provided in groove 45 (this shoulder is on the left side of the slot 45 when viewing the indicator block 10 from the front). The cavity 66 (as well as the other lamp cavities in the block 10) extends to, or slightly past, its respective slot 44 in order to provide efficient light transmission between the lamp which is situated within the cavity and the tab end of the indicator plate which is positioned in the slot.

As will be apparent to those skilled in the art, the indicator block 10 may be made from any suitable material, such as by aluminum, and may be formed in various ways, as by casting or extruding. If the block is extruded it will be appreciated that it is difficult to provide the shoulders (such as 98 and 99 in FIGS. 4a and 4b) in the slots. The block may be extruded to provide the shoulder across the width of the block, with the remaining portion of the slot being ground away after the extrusion process. Conversely, the block may be extruded to provide the slot without the shoulder, and a suitable insert placed in the slot to serve the purpose of the shoulder. It will be appreciated that a shoulder is not required in each slot (such as the slot 41 in FIG. 2) but these are only required where a cavity has to extend beyond (forwardly) of the particular slot in order to provide isolation between adjacent cavities.

Each of the cavities may be formed in the casting process, or they may be drilled. It will be appreciated that each of these cavities extends to a different depth in order that they may intersect their respective slots. Listed below in Table I are representative depths for these cavities where the indicator block 10 has a total depth of one inch.

TABLE I

| Cavity | Depth (in inches) | Indicia |
| --- | --- | --- |
| 65 | .955 | Decimal point |
| 66 | .915 | 6 |
| 67 | .875 | 3 |
| 68 | .835 | 2 |
| 69 | .795 | 5 |
| 70 | .755 | 8 |
| 71 | .715 | 9 |
| 72 | .675 | 0 |
| 73 | .635 | 7 |
| 74 | .595 | 4 |
| 75 | .555 | 1 |

As noted previously, the lamp assembly 11 shown in FIG. 1 includes eleven lamps 85 through 95. As stated previously, each of these lamps must extend into the indicator block 10 a different distance in order to intersect the particular slot associated therewith to provide illumination of the end of the plate located in the respective slot. The lamp assembly includes a base 106 for supporting the lamps 85 through 95. The base 106, which may be a printed circuit board, may be provided with appropriate holes through which the leads from the lamps pass. Each of the lamps may be positioned in depth by a respective sleeve, such as a sleeve 108. That is, the leads from each lamp are passed through a respective sleeve 108 and then through appropriate holes in the base 106. Each of the sleeves 108 may be constructed of a suitable material, such as a fluorocarbon sold under the trademark Teflon, and cut at a different length in order to position the bulbs at the necessary depth in the lamp block 10. The leads from the lamps may be soldered to appropriate terminals, such as printed circuit "pads," on the board 106, and these terminals may be contacted by individual contacts, such as contact 110, on the pressure contactor 12.

Fastening means, such as screws 111 and 112 may be employed to secure the pressure contactor and lamp assembly to the indicator block. This arrangement also serves to hold the two parts 30 and 31 of the indicator block 10 together. Threaded holes 113 and 114 may be provided on the front of the indicator block 10 for mounting the block to the panel of an instrument, or the like.

FIG. 5 illustrates an exemplary set of indicator plates 15 through 25. Each plate includes a viewable portion, such as the portion 116 of plate 16 upon which the indicia is inscribed, and a tab, such as a tab 117 on the plate 16. The plates are arranged in the indicator block 10 in the order illustrated in FIG. 5.

The numerals inscribed on the plates 15 through 25 are preferably in a silhouette form, being provided by two finely inscribed lines which provide greater legibility of all indicia presented by the indicator device. A typical line, identified by a numeral 118 on the plate 16 in FIG. 5 may be, for example, five mils wide and five mils deep. The separation between the lines forming a numeral or a symbol, which may be termed the stroke width, may be approximately sixty mils. Typical numeral height is five hundred mils. The fine double inscribed symbol provides greater illumination than a single heavy inscribed symbol, and additionally creates less obstruction to the symbols falling toward the back of the stack of plates (toward the rear of the indicator device).

Because of certain physical and physiological facts, the silhouette form of inscription provides greatly improved indicia presentations. Assuming that a given line is illuminated brightly enough such that the human eye can perceive its existence, there is no lower limit to the narrowness of the line width. Additionally, the apparent width of a very fine line is a function of the brightness of illumination thereof. In theory, a very thin and very brightly illuminated line appears to be a heavy or wide line when illuminated, but when unilluminated the line appears to disappear and thus presents no obstruction to further displaced indicia falling behind and within the same area of view. Furthermore, two fine lines in close proximity on the surface of the plate provide more than twice the brightness of a single line of the same dimensions. This increase in brightness results from additional multiple reflections and reinforcement and leads to the conclusion that a greater brightness-to-obstruction ratio is obtained with a multiple line inscription, with the practical number of lines being essentially determined by inscription methods.

The lines may be inscribed, or impressed, into each plate, typically on the back side thereof. The use of double lines allows various styles of numerals and other indicia to be provided with an optimum stroke width to numeral height. Conventional indicia shapes can be provided to facilitate fast and error-free reading thereof.

A suitable filter, such as a polarizing plastic plate, may be provided in front of the forward indicia-bearing plate (plate 15 in FIG. 1) to reduce unwanted reflections from external light sources. Additionally, a mask may be provided on the face of each plate, such as a mask 120 shown on the plate 15 in FIG. 5. Such masks aid in providing optical isolation between adjacent plates and increase the efficiency of the indicator device.

According to an additional feature of the present invention, the construction of the indicator block 10 in two parts 30 and 31 provides improved versatility in assembling indicator devices. It will be noted that the upper part 30 includes six cavities and the lower part 31 includes five cavities. These two parts may be joined as illustrated in FIG. 1 to provide an indicator device having eleven indicia-bearing plates. Two of the upper parts 30 may be combined to provide an indicator device having twelve indicia-bearing plates; whereas, two of the lower parts 31 may be combined to provide an indicator device having ten indicia-bearing plates. Obviously, different numbers of cavities can be provided in either one or both of the parts to provide additional flexibility.

Although particular structures, dimensions, etc., have been discussed in connection with a specific exemplary embodiment of an indicator device constructed in accordance with the teachings of the present invention, others may be utilized. Furthermore, it will be understood that although an exemplary embodiment of the present invention has been disclosed and discussed, other structures and applications are possible and that the embodiment disclosed may be subjected to various changes, modifications and substitutions without necessarily departing from the spirit of the invention.

What is claimed is:

1. A multi-symbol visual indicator comprising member means for supporting a plurality of stacked plates of transparent material for internally reflecting light within said plates, each plate having a symbol thereon, an individual source of light located adjacent an edge thereof, said plates being superimposed one behind the other thereby substantially superimposing said symbols such that as each symbol is illuminated it may be observed from substantially the same area at the front of said indicator, the improvement comprising each of said plates being substantially flat and including a viewable portion upon which a symbol is located, and each having a tab portion extending from the edge thereof beyond the plates superimposed behind it, said member means having a plurality of slots for receiving the respective tab portions of said plates and maintaining said plates in a stacked relationship, and said member means having a plurality of cavities extending nominally at right angles to the planes of the plates, each of the cavities being at a depth sufficient to communicate with a single respective tab portion, said cavities serving to receive the individual sources of light.

2. A multi-symbol visual indicator as in claim 1 wherein, said tab portions on adjacent plates extend from opposite ends thereof.

3. A multi-symbol visual indicator as in claim 1 wherein said member means comprises two parts, and means for aligning and holding the two parts for forming a unitary structure.

4. A multi-symbol visual indicator as in claim 1 wherein the sources of light are mounted on a base, with certain of said sources of light extending a different distance from said base, and the sources of light and base assembly are positioned with respect to said member means such that each of said sources of light is located within a respective cavity.

5. A multi-symbol visual indicator as in claim 4 wherein each of said sources of light is mounted on said base by a sleeve, the length of each respective sleeve determining the distance that its respective source of light extends from said base member.

6. A multi-symbol visual indicator as in claim 4 including a retainer member which may be positioned over at least a portion of said member means for aiding in retaining said plates in position thereon.

7. A multi-symbol visual indicator as in claim 1 wherein certain of said slots in said member means include baffle means for providing optical isolation between the tab portion of the plate located in the respective slot and more than one cavity.

8. A readout device comprising an indicator block, a plurality of substantially flat plates of transparent material, at least certain of said plates having a symbol inscribed thereon, said indicator block including a plurality of substantially parallel slots therein, each of said plates having an edge adapted to receive illumination from a light source which is positioned in a respective slot whereby said plates are supported in a stacked relationship and being superimposed one behind the other, said edge of each extending beyond the plates superimposed behind it, said indicator block having a plurality of various depth cavities extending from the rear thereof and intersecting respective ones of said slots, said cavities being adapted to receive respective lamps for illuminating the respective edges of said plates.

9. A readout device as in claim 8 wherein said indicator block is constructed in two abutting sections, certain of said slots have a configuration to allow communication between a slot and only one cavity, and the symbols on certain of said plates are formed by double inscribed lines.

10. A readout device as in claim 8 wherein said indicator block is constructed in two abutting sections, certain of said slots have a baffle positioned therein to allow communication between a slot and only one cavity, and the symbols on certain of said plates are formed by double inscribed lines.

11. A readout device as in claim 8 including a lamp assembly including a plurality of lamps and a base, the lamps being connected with the base, and sleeves coupled with the lamps for positioning the lamps at various distances from said base, and said lamp assembly being positioned with said indicator block with respective lamps located within respective cavities whereby said lamps communicate with respective edges of said plates through respective slots in said indicator block.

References Cited by the Examiner
UNITED STATES PATENTS

| | | | |
|---|---|---|---|
| 2,751,584 | 6/1956 | Isborn | 340—380 |
| 2,766,447 | 10/1956 | Woodson et al. | 340—380 |
| 2,813,266 | 11/1957 | Kay et al. | 340—380 X |
| 3,150,362 | 9/1964 | Belanich | 340—380 X |

NEIL C. READ, *Primary Examiner.*

D. L. TRAFTON, *Assistant Examiner.*